United States Patent
Okada et al.

(10) Patent No.: US 7,922,526 B2
(45) Date of Patent: Apr. 12, 2011

(54) ELECTRICAL EQUIPMENT

(75) Inventors: Jun Okada, Yokkaichi (JP); Masayuki Ishikura, Yokkaichi (JP); Jiro Fukui, Yokkaichi (JP); Masatoshi Koike, Yokkaichi (JP)

(73) Assignees: AutoNetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 93 days.

(21) Appl. No.: 11/887,586

(22) PCT Filed: Nov. 30, 2005
(Under 37 CFR 1.47)

(86) PCT No.: PCT/JP2005/021971
§ 371 (c)(1),
(2), (4) Date: Aug. 5, 2008

(87) PCT Pub. No.: WO2006/117892
PCT Pub. Date: Nov. 9, 2006

(65) Prior Publication Data
US 2010/0041268 A1 Feb. 18, 2010

(30) Foreign Application Priority Data
Apr. 28, 2005 (JP) ................................. 2005-131395

(51) Int. Cl.
*H01R 13/73* (2006.01)
(52) U.S. Cl. ........................................................ 439/544
(58) Field of Classification Search .................. 439/544, 439/549
See application file for complete search history.

(56) References Cited

U.S. PATENT DOCUMENTS

| | | | |
|---|---|---|---|
| 2,938,188 A * | 5/1960 | Lazzery | 439/544 |
| 4,580,884 A | 4/1986 | Sugiura et al. | |
| 4,703,394 A * | 10/1987 | Petit et al. | 361/790 |
| 4,850,884 A | 7/1989 | Sawai et al. | |
| 5,052,938 A * | 10/1991 | Hansford et al. | 439/131 |

(Continued)

FOREIGN PATENT DOCUMENTS
JP U 48-105076 12/1973
(Continued)

OTHER PUBLICATIONS

Office Action issued in Japanese Patent Application No. 2005-131395; issued Mar. 16, 2010; with English-language translation.

(Continued)

*Primary Examiner* — T C Patel
*Assistant Examiner* — Vladimir Imas
(74) *Attorney, Agent, or Firm* — Oliff & Berridge, PLC (57) ABSTRACT

It is an object to provide electrical equipment eliminating the need to change the diameter of wires, and capable of improving assembly workability. Vehicle-mounted camera equipment includes a circuit substrate having a substrate connector, and a camera housing. An inside connector section which is connected to the substrate connector is provided integrally on an inner surface side of the camera housing, and an outside connector section which is connected to an external connector provided at the end of an external harness is provided integrally on an outer surface side of the camera housing. Connector terminals of the inside connector section and connector terminals of the outside connector section are connected by connecting conductors, respectively, which are provided to be buried in the camera housing. The connector terminals, and the connecting conductors are made of a single conductive material.

19 Claims, 5 Drawing Sheets

U.S. PATENT DOCUMENTS

| | | | | |
|---|---|---|---|---|
| 5,139,431 A * | 8/1992 | Saitoh et al. | ................ | 439/364 |
| 5,161,998 A * | 11/1992 | Defibaugh et al. | ............ | 439/544 |
| 5,284,448 A * | 2/1994 | Hussmann et al. | ............ | 439/544 |
| 5,328,388 A * | 7/1994 | Fust et al. | ................ | 439/544 |
| 6,579,111 B2 * | 6/2003 | Fukamachi | ................ | 439/247 |
| 6,592,401 B1 * | 7/2003 | Gardner et al. | ............ | 439/544 |
| 6,611,066 B2 | 8/2003 | Onizuka et al. | | |
| 6,616,480 B2 | 9/2003 | Kameyama | | |
| 7,150,633 B2 * | 12/2006 | Ishikura et al. | ............ | 439/76.1 |
| 7,338,304 B2 | 3/2008 | Kameyama et al. | | |
| 7,527,522 B2 * | 5/2009 | Kondou | ................ | 439/552 |
| 2001/0018294 A1 | 8/2001 | Kameyama | | |
| 2005/0239326 A1 * | 10/2005 | Ishikura et al. | ............ | 439/568 |
| 2006/0094293 A1 * | 5/2006 | Daggett et al. | ............ | 439/544 |
| 2007/0155226 A1 * | 7/2007 | Chen | ................ | 439/544 |

FOREIGN PATENT DOCUMENTS

| | | |
|---|---|---|
| JP | U 3-63988 | 6/1991 |
| JP | A 7-205082 | 8/1995 |
| JP | A-7-272788 | 10/1995 |
| JP | A 8-45627 | 2/1996 |
| JP | A 2001-71583 | 3/2001 |
| JP | A 2001-176617 | 6/2001 |
| JP | A-2001-244012 | 9/2001 |
| JP | A 2001-327044 | 11/2001 |
| JP | A 2002-231375 | 8/2002 |
| JP | A 2002-359017 | 12/2002 |
| WO | WO 2005/109579 A1 | 11/2005 |

OTHER PUBLICATIONS

Office Action issued in Japanese Patent Application No. 2005-131395; issued Jul. 7, 2010; with English-language translation.

German Office Action dated Aug. 11, 2010, with English translation.

\* cited by examiner

ELECTRICAL EQUIPMENT

TECHNICAL FIELD

The present invention relates to electrical equipment such as vehicle-mounted camera equipment connected to external equipment via an external harness.

BACKGROUND ART

Figure 5:
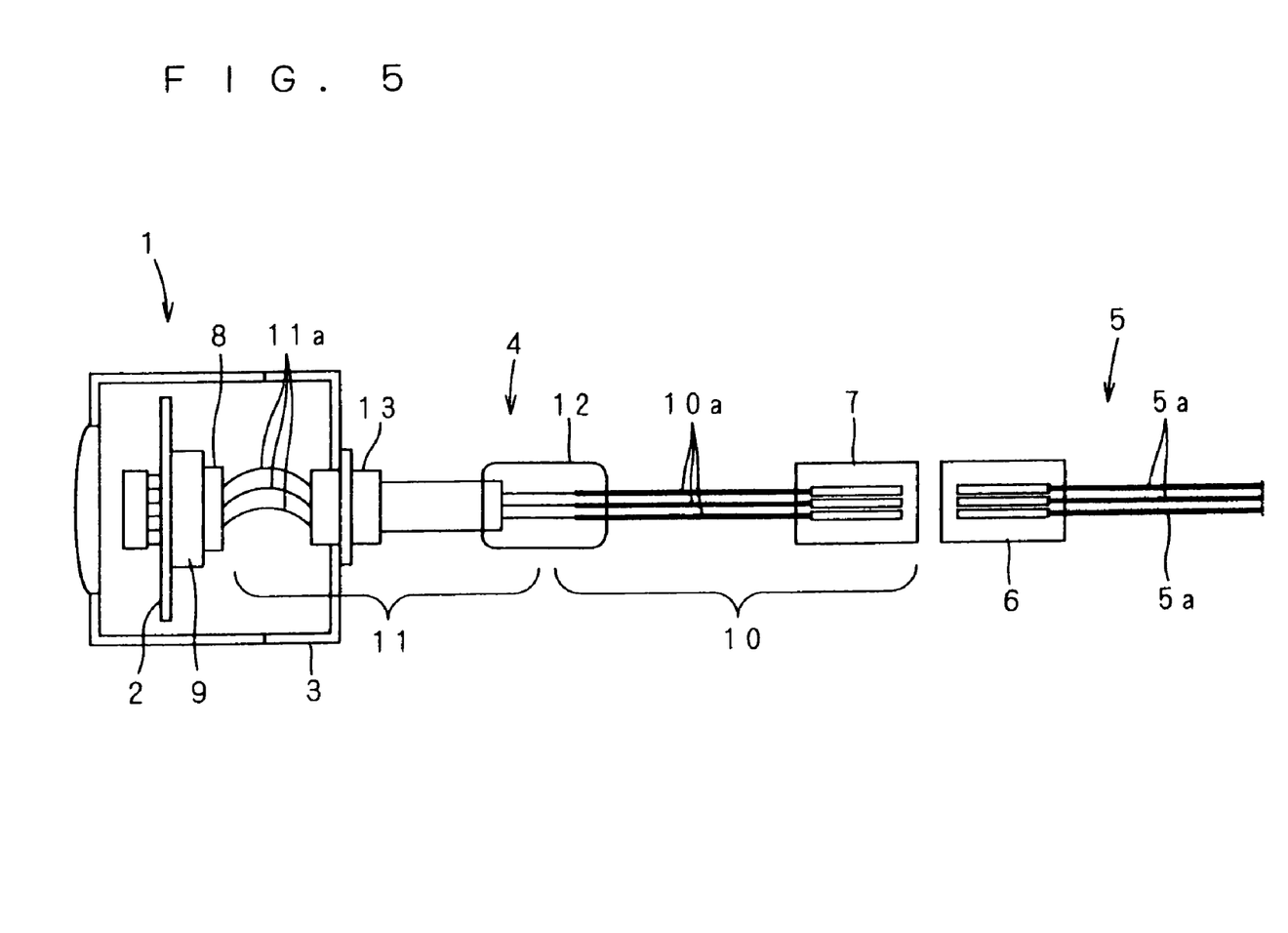
FIG. 5 is an explanatory diagram of external interconnect lines of conventional vehicle-mounted camera equipment.

FIG. 5 depicts a background art technique suggested to connect vehicle-mounted camera equipment to other control equipment and a power supply.

As depicted in FIG. 5, vehicle-mounted camera equipment 1 has a structure in which a substrate 2 having an imaging element mounted thereon and a power supply circuit, a signal-processing circuit and the like formed thereon is housed in a case-shaped housing body 3 of two-part divided structure. The vehicle-mounted camera equipment 1 is connected to other control equipment, a power supply and the like via an equipment harness 4 and a vehicle-side harness 5.

The vehicle-side harness 5 has one end connected to other control equipment, a power supply and the like, and the other end connected to a harness-side connecting connector 6. This vehicle-side harness 5 typically consists of a group of wires 5a having a relatively large diameter (e.g. a cross-sectional area of 0.75 mm$^2$).

The equipment harness 4 has one end connected to an equipment-side connected connector 7, and becomes connected to the vehicle-side harness 5 via connector connection between this equipment-side connected connector 7 and the harness-side connecting connector 6. The equipment harness 4 has the other end connected to a substrate connecting connector 8, and becomes connected to the substrate 2 via connector connection between this connecting connector 8 and a substrate connector 9 provided on the substrate 2.

The equipment harness 4 includes a first equipment harness portion 10 which consists of a group of wires 10a having a relatively large diameter (e.g. a cross-sectional area of 0.75 mm$^2$) on the side of the vehicle-side harness 5, and a second equipment harness portion 11 which consists of a group of wires 11a having a relatively small diameter (e.g. a cross-sectional area of 0.15 mm$^2$) on the side of the substrate 2, which are connected via a connecting portion 12.

The equipment harness 4 includes the first equipment harness portion 10 and the second equipment harness portion 11 for reasons indicated below.

That is, as the substrate connector 9 provided on the substrate 2 is extremely small, the substrate connecting connector 8 connector-connected thereto needs to be small accordingly. This requires wires connected to connector terminals of the substrate connecting connector 8 to have a relatively small diameter as well. Thus, the equipment harness 4 needs to use the second equipment harness portion 11 which consists of the group of wires 11a having a relatively small diameter on the side of the substrate 2.

Meanwhile, as the vehicle-side harness 5 attached to the side of a vehicle consists of the group of wires 5a having a relatively large diameter due to the desire for flexibility resistance, the harness-side connecting connector 6 connected to the end of the vehicle-side harness 5 needs to be large accordingly. This requires the equipment-side connected connector 7 connector-connected to the harness-side connecting connector 6 to be large as well, and further requires wires connected to connector terminals of this large equipment-side connected connector 7 to have a relatively large diameter as well. Thus, the equipment harness 4 needs to use the first equipment harness portion 10 which consists of the group of wires 10a having a relatively large diameter on the side of the vehicle-side harness 5.

For these reasons, the equipment harness 4 includes the first equipment harness portion 10 and the second equipment harness portion 11.

In addition, the connecting portion 12, which is provided outside the housing body 3, needs to be subjected to waterproof treatment. To subject a connecting portion of wires to waterproof treatment, Japanese Patent Application Laid-Open No. 2002-359017 discloses an exemplary technique of covering the connecting portion of wires with a heat shrinkable tube and sealing its surroundings with epoxy type resin and the like.

Also in this background art technique, the substrate connecting connector 8 is connected to the substrate connector 9 on the side of the substrate 2, and the equipment harness 4 is drawn out of the housing body 3 through a drawing hole formed in the housing body 3. At a portion of this drawing hole, a grommet 13 made of rubber and the like is interposed between the periphery of the drawing hole and the equipment harness 4 to prevent water from entering the housing body 3. Further, the harness-side connecting connector 6 and the equipment-side connected connector 7 are connector-connected outside the housing body 3, to connect the equipment harness 4 and the vehicle-side harness 5.

DISCLOSURE OF INVENTION

However, the above background art technique requires difficult work in the assembly operation due to the need to draw the equipment harness 4 through the housing body 3 of the vehicle-mounted camera equipment 1, carry out the waterproof treatment on the drawn portion, and connect the substrate connector 9 of the substrate 2 and the substrate connecting connector 8.

Moreover, the equipment harness 4 has the structure in which the first equipment harness portion 10 which consists of the group of wires 10a having a relatively large diameter and the second equipment harness portion 11 which consists of the group of wires 11a having a relatively small diameter are connected via the connecting portion 12, and needs to change the diameter of the wires in paths of the equipment harness 4 by connecting the wires 10a having a relatively large diameter and the wires 11a having a relatively small diameter with conductors. This connecting portion also needs to be subjected to waterproof treatment and the like using a heat shrinkable tube or sealing resin.

The present invention therefore has an object to provide electrical equipment eliminating the need to change the diameter of wires, and capable of improving assembly workability.

In a first aspect of the present invention, electrical equipment connected to external equipment via an external harness includes: an internal electrical component; and a case-shaped housing body housing the internal electrical component therein, wherein a plurality of inside terminal parts electrically connected to the internal electrical component are provided on an inner surface side of the housing body, and an outside connector section electrically connected to the external harness is provided integrally on an outer surface side of the housing body, the inside terminal parts and connector terminals of the outside connector section being connected by connecting conductors provided in the housing body, respectively.

According to the first aspect of the present invention, the internal electrical component is connected to the inside terminal parts of the housing body. It is therefore unnecessary to draw a harness through a housing body as discussed in the background art, thus improving assembly workability. In addition, since the inside terminal parts and the connector terminals of the outside connector section are connected by the connecting conductors, respectively, the diameter of wires does not need to be changed in wire paths as in the background art.

In this case, one of the inside terminal parts, one of the connector terminals of the outside connector section, and one of the connecting conductors which connects the one of the inside terminal parts and the one of the connector terminals may be made of a single conductive material.

This will further simplify the structure.

In a second aspect of the present invention, electrical equipment connected to external equipment via an external harness includes: an internal electrical component including a component-side connector; and a case-shaped housing body housing the internal electrical component therein, wherein an inside connector section connected to the component-side connector is provided integrally on an inner surface side of the housing body, and an outside connector section electrically connected to the external harness is provided integrally on an outer surface side of the housing body, connector terminals of the inside connector section and connector terminals of the outside connector section being connected by connecting conductors provided in the housing body, respectively, and one of the connector terminals of the inside connector section, one of the connector terminals of the outside connector section, and one of the connecting conductors which connects the one of the connector terminals and the one of the connector terminals are made of a single conductive material.

According to the second aspect of the present invention, the component-side connector of the internal electrical component is connected to the inside connector section of the housing body. It is therefore unnecessary to draw a harness through a housing body as discussed in the background art, thus improving assembly workability and further simplifying the structure.

These and other objects, features, aspects and advantages of the present invention will become more apparent from the following detailed description of the present invention when taken in conjunction with the accompanying drawings.

BEST MODES FOR CARRYING OUT THE INVENTION

Descriptions are given of electrical equipment according to preferred embodiments of the present invention. While the electrical equipment is assumed to be vehicle-mounted camera equipment in these embodiments, the present invention is also applicable to typical electrical equipment which is electrically connected to external equipment via an external harness, such as various kinds of vehicle-mounted electrical equipment and typical module equipment.

Figure 1:
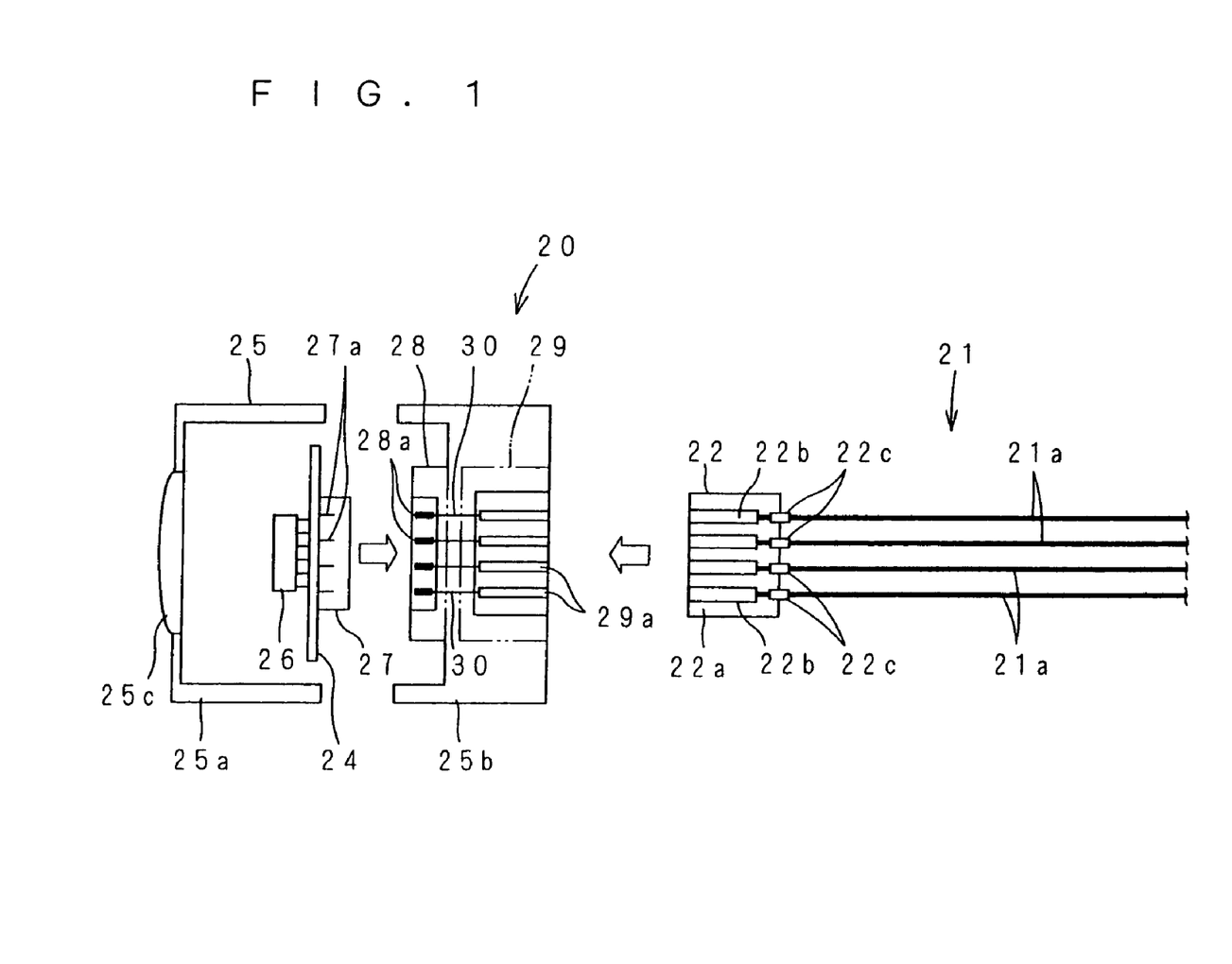
FIG. 1 is a disassembled explanatory diagram according to a first preferred embodiment of the present invention.

FIG. 1 is an explanatory diagram of vehicle-mounted camera equipment 20 and an external harness 21 according to a first preferred embodiment. This vehicle-mounted camera equipment 20 is a device which is installed on a bumper or grille of a vehicle to image external scenes of the vehicle, forms a so-called blind corner monitor, back monitor and the like, and is connected to external equipment such as a power supply and a display device inside the car via the external harness 21.

The external harness 21 forms a vehicle-side harness in which a plurality of wires 21a have an external connector 22 as a harness-side connector attached to their ends. Each of the wires 21a has a relatively large diameter (e.g. a cross-sectional area of 0.75 mm$^2$) in terms of flexibility resistance.

The external connector 22 incorporates connector terminals 22b (e.g. female terminals) corresponding to the respective wires 21a, respectively, in a connector housing 22a. Namely, in accordance with the diameter of the wires 21a, the connector terminals 22b have a shape capable of crimping onto the wires 21a having a relatively large diameter.

The end of each of the wires 21a having each of the connector terminals 22b crimped thereon has a waterproof plug 22c made of rubber, flexible resin, and the like mounted thereon. With the connector terminals 22b being incorporated in the connector housing 22a, each of the waterproof plugs 22c seals between the connector housing 22a and each of the wires 21a in a waterproof manner.

The vehicle-mounted camera equipment 20 includes a circuit substrate 24 as an internal electrical component, and a camera housing 25 as a case-shaped housing body capable of housing the circuit substrate 24 therein.

The circuit substrate 24 has an imaging element 26 such as a CCD element and a substrate connector 27 as a component-side connector mounted thereon, and also has a power supply circuit, a signal-processing circuit and the like for the imaging element 26 formed thereon. Further, the substrate connector 27 is provided with connector terminals 27a (e.g. male terminals) for supplying power to and exchanging signals with the circuit substrate 24. The circuit substrate 24 is housed and fixed by screws and the like in the camera housing 25 in a position and orientation that allow the imaging element 26 to image external scenes.

The camera housing 25 has a two-part divided structure of a front case section 25a and a rear case section 25b, which are combined with each other as appropriate by screws and the like via a sealing material, to be joined together in a waterproof manner.

The front case section 25a is made of resin and the like, and has an imaging window 25c incorporated on its one main surface. The imaging element 26 in the camera housing 25 images external scenes through this imaging window 25c.

The rear case section 25b is also made of resin and the like, and has one thick main surface. An inside connector section 28 which is removably connector-connected to the substrate connector 27 is provided integrally on an inner surface side of that main surface, and an outside connector section 29 which is removably connector-connected to the external connector 22 of the external harness 21 is provided integrally on an outer surface side of that main surface.

The inside connector section 28 is provided with connector terminals 28a (e.g. female terminals) which are connected to the connector terminals 27a of the substrate connector 27, respectively, and the outside connector section 29 is provided with connector terminals 29a (e.g. male terminals) which are connected to the connector terminals 22b of the external connector 22, respectively. The connector terminals 28a of the inside connector section 28 and the connector terminals 29a of the outside connector section 29 are connected by connecting conductors 30, respectively, which are provided to be buried in the rear case section 25b. The rear case section 25b has a structure similar to that of a so-called board-to-board connector. Naturally, one of the connector terminals 28a, its corresponding one of the connector terminals 29a, and the connecting conductor 30 connecting these terminals may be made of different materials, or may be made of a single material. The structure is more simplified in the latter case.

As the substrate connector 27 mounted on the circuit substrate 24 is extremely small, the connector terminals 27a incorporated therein are also small. Thus, the connector terminals 28a in the inside connector section 28 which are connector-connected to this substrate connector 27 are also small.

Meanwhile, the connector terminals 22b in the external connector 22 on the side of the external harness 21 are relatively large in accordance with the wires 21a having a relatively large diameter in the external harness 21. Thus, the connector terminals 29a in the outside connector section 29 which are connector-connected to this external connector 22 are also large in accordance with the relatively large connector terminals 22b.

In assembling the vehicle-mounted camera equipment 20, the substrate connector 27 on the circuit substrate 24 is connector-connected to the inside connector section 28 formed integrally on the inner surface of the rear case section 25b, to join the front case section 25a and the rear case section 25b together.

Further, in connecting interconnect lines to the vehicle-mounted camera equipment 20 assembled in this manner to have a module structure, the external connector 22 of the external harness 21 is connector-connected to the outside connector section 29 formed integrally on the outer surface of the rear case section 25b. As a result, the circuit substrate 24 which is an internal electrical component is electrically connected to external equipment such as external control equipment and an external power supply via the substrate connector 27, the inside connector section 28, the connecting conductors 30, the outside connector section 29, the external connector 22, and the external harness 21.

As described above, the structure according to this embodiment includes the inside connector section 28 formed integrally on the inner surface side of the rear case section 25b and the outside connector section 29 formed integrally on the outer surface side, with the connector terminals 28a of the inside connector section 28 and the connector terminals 29a of the outside connector section 29 being connected by the connecting conductors 30, respectively, which are buried in the rear case section 25b. In assembling the vehicle-mounted camera equipment 20, the substrate connector 27 of the circuit substrate 24 is connector-connected to the inside connector section 28 of the rear case section 25b to join the front case section 25a and the rear case section 25b together. It is therefore unnecessary to draw the equipment harness 4 through the housing body 3 as discussed in the background art, thus improving assembly workability.

In addition, since the connector terminals 28a of the inside connector section 28 which is connected to the substrate connector 27 and the connector terminals 29a of the outside connector section 29 which is connected to the external connector 22 are connected by the connecting conductors 30, respectively, the diameter of the wires does not need to be changed in wire paths as in the background art.

Further, the connecting conductors 30 in the rear case section 25b serve to change the diameter of wires, which was changed outside the vehicle-mounted camera equipment 1 in the background art. This eliminates the need to draw the harness 4 for external connection as in the background art, thus attaining miniaturization.

It is also unnecessary to connect wires having a relatively large diameter and wires having a relatively small diameter and subject those wires to waterproof treatment outside the device as in the background art. This simplifies the structure and makes the manufacture easy, and also reduces the costs.

Moreover, in connecting interconnect lines, the vehicle-mounted camera equipment 20 can be connected to external equipment by connector-connecting the external connector 22 of the external harness 21 directly to the outside connector section 29 of the camera housing 25. The connecting operation is thus done easily.

Further, forming the inside connector section 28 and the outside connector section 29 integrally on the rear case section 25b reduces the number of components to simplify the structure, and ensures waterproof performance between the rear case section 25b and the inside connector section 28 or the outside connector section 29.

Additionally, a waterproof sealing material and the like may be disposed between a fitting concave inner surface side of the outside connector section 29 to which the external connector 22 fits and an outer surface side of the external connector 22, to employ the waterproof structure that resists water upon connector-connection.

By employing such waterproof structure, water is effectively prevented from entering the outside connector section 29 and the camera housing 25.

Moreover, the rear case section 25b including the inside connector section 28 and the outside connector section 29 can be manufactured easily by disposing terminal conductors each integrally including the connector terminal 28a, the connecting conductor 30 and the connecting terminal 29a to predetermined positions, and integrally molding them by resin by insert-molding, for example.

Furthermore, the rear case section 25b including the inside connector section 28 and the outside connector section 29 may be integrally molded by flexible resin, and then terminal conductors each integrally including the connector terminal 28a, the connecting conductor 30 and the connecting terminal 29a may be inserted to be mounted from the side of the outside connector section 29 and held while being prevented from being disconnected by an appropriately provided locking mechanism.

In such a case, it is preferable that the flexible resin forming the rear case section 25b be made of resin for connectors such as polybutylene terephthalate (PBT), nylon, and polyphenylene sulfide (PPS). With those kinds of resin, structures for connectors such as a locking section and a locked section can be formed easily on the rear case section 25b.

Figure 2:
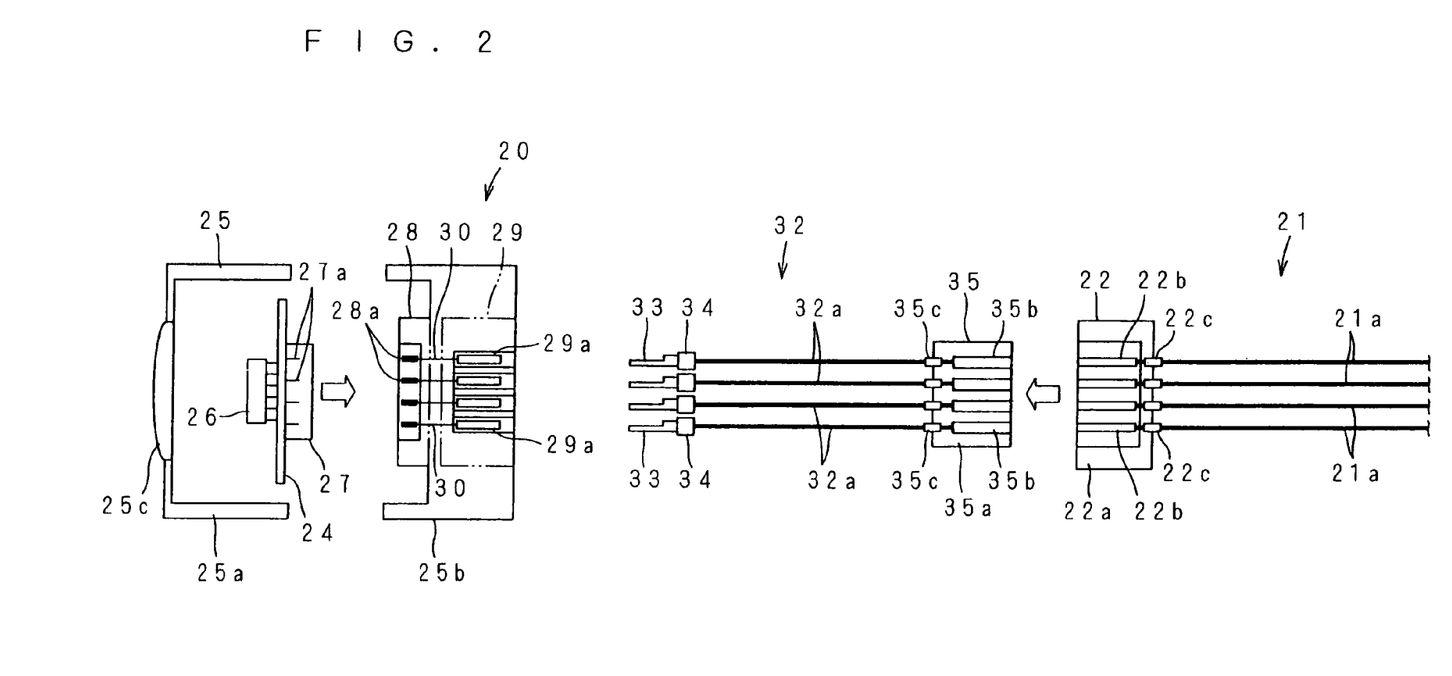
FIG. 2 is a disassembled explanatory diagram according to a second preferred embodiment.

FIG. 2 illustrates a second preferred embodiment. Like references indicate similar elements to those in the first preferred embodiment, to omit their descriptions.

That is, in this embodiment, the outside connector section 29 of the vehicle-mounted camera equipment 20 and the external harness 21 are electrically connected via a relay harness 32.

The relay harness 32 includes a desired number of wires 32a having a relatively large diameter like the wires 21a. The wires 32a are relatively short, and thus do not have to be shielded wires. A connecting terminal 33 (e.g. male terminal)

which is connected to the connector terminal 29a (e.g. female terminal) of the outside connector section 29 is crimped onto each of the wires 32a with a waterproof plug 34 made of rubber, flexible resin, and the like. Upon connecting the connecting terminals 33 to the connector terminals 29a, respectively, each of the waterproof plugs 34 is joined to each concave inner circumference surface housing each of the connector terminals 29a in a waterproof manner.

Also, each of the wires 32a has the other end attached to a relay connector 35 capable of being connected to the external connector 22 of the external harness 21. The relay connector 35 incorporates connector terminals 35b (e.g. female terminals) which are connected to the connector terminals 22b (e.g. male terminals) of the external connector 22, respectively, in a connector housing 35a.

The end of each of the wires 32a having each of the connector terminals 35b crimped thereon has a waterproof plug 35c made of rubber, flexible resin, and the like mounted thereon. With the connector terminals 35b being incorporated in the connector housing 35a, each of the waterproof plugs 35c seals between the connector housing 35a and each of the wires 32a in a waterproof manner.

Further, in connecting interconnect lines to the vehicle-mounted camera equipment 20, the connecting terminals 33 mounted on the ends of the wires 32a of the relay harness 32 are connected to the connector terminals 29a the outside connector section 29 formed integrally on the outer surface of the rear case section 25b, respectively, and the relay connector 35 on the other ends is connector-connected to the external connector 22 of the external harness 21. As a result, the circuit substrate 24 which is an internal electrical component is electrically connected to external equipment such as external control equipment and an external power supply via the relay harness 32.

This embodiment has similar advantages to those of the first preferred embodiment, and is also applicable to various connection methods because the outside connector section 29 and the external harness 21 can be electrically connected via the relay harness 32.

Further, the waterproof plugs 34 effectively prevent water from entering connected portions of the connector terminals 29a of the outside connector section 29 and the connecting terminals 33 of the relay harness 32.

Additionally, a waterproof sealing material and the like may be disposed between a fitting concave inner surface side of the external connector 22 to which the relay connector 35 fits and an outer surface side of the relay connector 35, to employ the waterproof structure that resists water upon connector-connection. This also effectively prevents water from entering the compatible connected portion.

Alternatively, the relay connector 35 may be provided on both ends of the relay harness 32, to be connector-connected to the outside connector section 29 as well.

Figure 3:
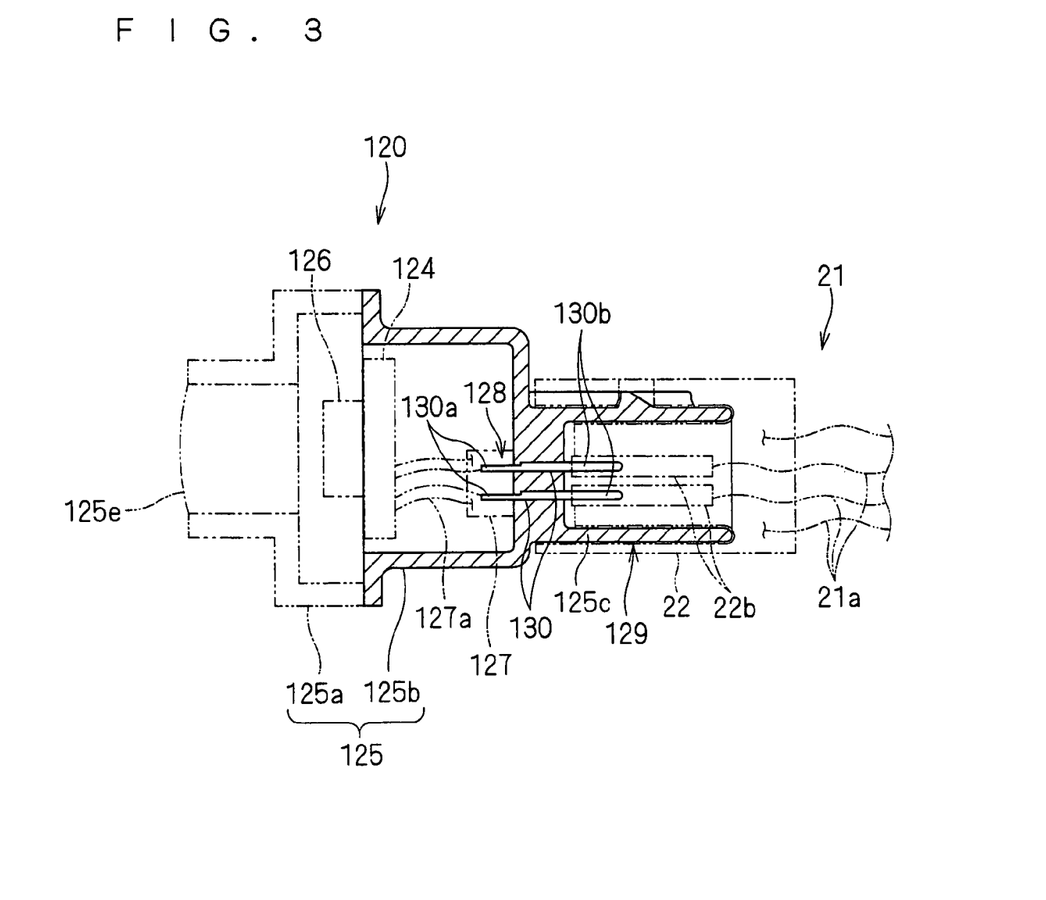
FIG. 3 is an explanatory diagram according to a third preferred embodiment.
Figure 4:
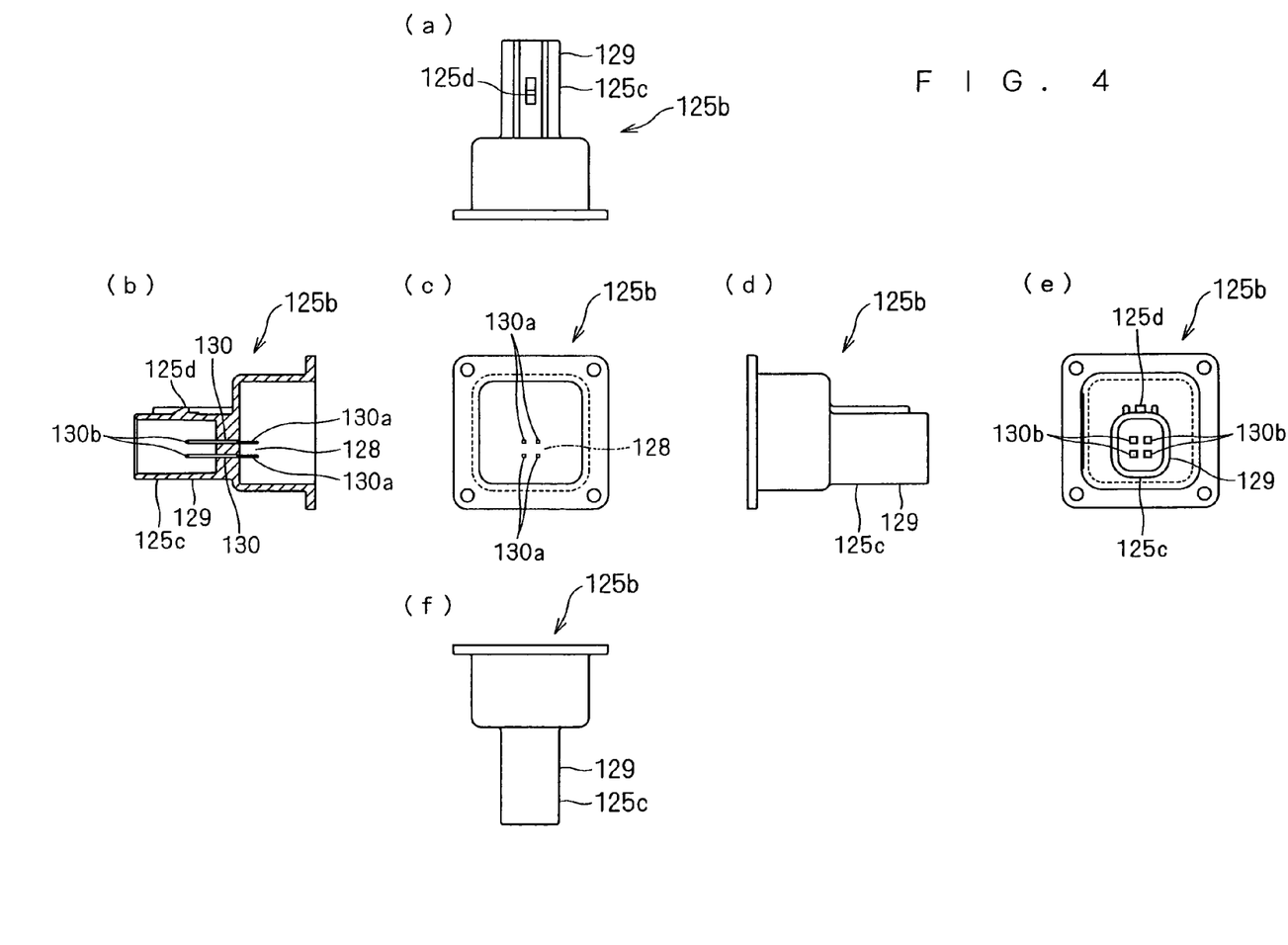
FIG. 4(a) is a plan view of a rear case section.
FIG. 4(b) is a cross-sectional view of the rear case section.
FIG. 4(c) is a front view of the rear case section.
FIG. 4(d) is a side view of the rear case section.
FIG. 4(e) is a back view of the rear case section.
FIG. 4(f) is a bottom view of the rear case section.

FIG. 3 is an explanatory diagram of vehicle-mounted camera equipment according to a third preferred embodiment, and FIG. 4 illustrates a rear case section of the equipment. Again in this third preferred embodiment, the electrical equipment is assumed to be vehicle-mounted camera equipment.

This vehicle-mounted camera equipment 120 includes a circuit substrate 124 as an internal electrical component, and a camera housing 125 as a case-shaped housing body capable of housing the circuit substrate 124 therein.

The circuit substrate 124 has an imaging element 126 such as a CCD element mounted thereon, and also has a power supply circuit, a signal-processing circuit and the like for the imaging element 126 formed thereon.

An interconnect line material 127a for power supply or signal exchange is drawn from this circuit substrate 124, with a single connector 127 attached to the end of the interconnect line material 127a. This circuit substrate 124 receives power supply from the outside or exchanges signals with the outside via the connector 127. The interconnect line material 127a includes single wire, a FFC (flexible flat cable), a FPC (flexible print substrate), and the like.

This circuit substrate 124 is housed and fixed by screws and the like in the camera housing 125 in a position and orientation that allow the imaging element 126 to image external scenes.

The camera housing 125 has a two-part divided structure of a front case section 125a and a rear case section 125b, which are combined with each other as appropriate by screws and the like via a sealing material, to be joined together in a waterproof manner.

The front case section 125a is made of resin and the like, and has a prescribed optical system 125e including a lens and the like incorporated on its one main surface. The imaging element 126 in the camera housing 125 images external scenes in a prescribed range through the optical system 125e.

The rear case section 125b is also made of resin and the like, and has a plurality of (4 in this case) relay terminal materials 130 arranged as appropriate (almost rectangular arrangement in this case) on its one main surface.

Each of the relay terminal materials 130 is a long conductive material, and has one end which is formed to have a smaller diameter than the other end. The end of smaller diameter of each of the relay terminal materials 130 is referred to as an inside connector terminal 130a, and the end of large diameter as an outside connector terminal 130b. That is, one of the inside connector terminals 130a, its corresponding one of the outside connector terminals 130b and a connecting conductor connecting these terminals (a middle portion of the relay terminal material 130 in this case) are made of a single conductive material.

Such relay terminal materials 130 are formed by die-cutting a metal plate in an appropriate pattern, for example, and has Sn-plated soft copper and the like as the base metal plate, for example. To increase connection reliability, it is preferable that portions of the inside connector terminals 130a of small diameter which tend to have a small contact area with terminals on the other side be plated with gold. And to reduce cost, it is preferable that the inside connector terminals 130a and the outside connector terminals 130b of the relay terminal materials 130 be formed as square-shaped terminals. In such case, to increase connection reliability with terminals on the other side, it is preferable that contact surfaces with the terminals on the other side be a smooth surface (surface of a base plate to be processed) which is not a shear surface at the time of shearing the terminal materials.

Alternatively, the respective portions of the relay terminal material 130 may be made of different materials which will be connected later by soldering, welding and the like.

Each of the relay terminal materials 130 is insert-molded on the one main surface of the rear case section 125b such that the inside connector terminal 130a projects inside of the rear case section 125b and the outside connector terminal 130b projects outside of the rear case section 125b.

The plurality of inside connector terminals 130a projecting inside of the rear case section 125b in the prescribed arrangement form an inside connector section 128. By connecting the connector 127 to this inside connector section 128, connector terminals (e.g. female terminals) on the side of the connector 127 are electrically connected to the inside connector terminals 130a, respectively.

Outside the one main surface of the rear case section 125*b*, a connector housing 125*c* extending toward the outside is formed integrally to surround the group of the outside connector terminals 130*b*. This connector housing 125*c* has a locking section 125*d* for engaging a connector on the other side and holding the connected state formed on the outer periphery thereof. This connector housing 125*c* and the outside connector terminals 130*b* form an outside connector section 129. By connector-connecting the external connector 22 having the structure described in the first preferred embodiment to this outside connector section 129, the connector terminals 22*b* (e.g. female terminals) on the side of the external connector 22 are electrically connected to the corresponding outside connector terminals 130*b*.

The inside connector terminals 130*a* have a relatively small diameter and the outside connector terminals 130*b* have a relatively large diameter for reasons similar to those described in the first preferred embodiment.

That is, as an interconnect line material in the camera housing 125 needs to be small and have a small diameter due to the space in the housing 125 and other reasons, connector terminals of the connector 127 need to have a small diameter accordingly. This requires the inside connector terminals 130*a* connected to the side of the connector 127 to have a small diameter as well.

Meanwhile, the connector terminals 22*b* inside the external connector 22 on the side of the external harness 21 have a relatively large diameter in accordance with the wires 21*a* having a relatively large diameter in the external harness 21. This requires the outside connector terminals 130*b* in the outside connector section 129 connector-connected to this external connector 22 to have a relatively large diameter as well.

In assembling the vehicle-mounted camera equipment 120 having this structure, the connector 127 on the side of the circuit substrate 124 is connector-connected to the inside connector section 28 formed on the inner surface of the rear case section 125*b*, to join the front case section 125*a* and the rear case section 125*b* together.

Further, in connecting interconnect lines to the vehicle-mounted camera equipment 120 assembled in this manner, the external connector 22 of the external harness 21 is connector-connected to the outside connector section 129 formed integrally on the outer surface of the rear case section 125*b*. As a result, the circuit substrate 124 which is an internal electrical component is electrically connected to external equipment such as external control equipment and an external power supply via the connector 127, the inside connector section 128, the relay terminal materials 130, the outside connector section 129, the external connector 22, and the external harness 21.

The vehicle-mounted camera equipment 120 having the above structure has similar advantages to those of the first preferred embodiment.

Further, the respective ends of the relay terminal material 130 insert-molded on the rear case section 125*b* form the inside connector terminal 130*a* and the outside connector terminal 130*b*. This simplifies the structure and makes the assembly easy, and also reduces the costs. Also, signal exchange, power supply and the like are conducted by the relay terminal materials 130 insert-molded through the inside and outside of the rear case section 125*b*, with excellent waterproof performance.

Moreover, the installation position and orientation, or the type of a vehicle for installation can be easily changed by changing the length of the external harness 21 and the like.

The inside connector section 28 and the substrate connector 27, or the inside connector terminals 130*a* and the connector 127 do not have to be connector-connected as in the first to third preferred embodiments. For example, an inside terminal section capable of being soldered or welded may be formed instead of the above connector terminals 28*a* or the inside connector terminals 130*a*, and interconnect line materials including lead lines, a FFC (flexible flat cable), a FPC (flexible print substrate), and the like on the side of the substrates 24 and 124 may be connected to that inside terminal section by soldering, welding, and the like.

Naturally, the items disclosed in the first to third preferred embodiments may be employed in appropriate combination. For example, the relay harness 32 in the second preferred embodiment may be used in the third preferred embodiment.

While the invention has been shown and described in detail, the foregoing description is in all aspects illustrative and not restrictive. It is therefore understood that numerous modifications and variations can be devised without departing from the scope of the invention.

The invention claimed is:

1. An electrical equipment connected to external equipment via an external harness, the electrical equipment comprising:
    an internal circuit substrate with a substrate connector having a plurality of substrate connector terminals that provide electrical connections to an electrical component mounted on the circuit substrate; and
    a case-shaped housing body having a two-part divided structure with a front case section and a rear case section, the case-shaped housing body housing said circuit substrate therein, wherein:
    the rear case section comprises:
        an inside connector mated and electrically connected with the substrate connector, the inside connector including a plurality of inside connector terminals and being provided on an inner surface side of the housing body;
        an outside connector integrally formed on an outer surface of the rear case section, the outside connector including outside connector terminals and being mated and electrically connected with the external harness, and
        connecting conductors provided in the rear case section that connect the inside connector terminals and the outside connector terminals;
    the rear case section, the outside connector section and the inside connector are integrally molded with resin; and
    the plurality of substrate connector terminals are mated to the plurality of inside terminals by insertion engagement between respective terminals.

2. The electrical equipment according to claim 1, wherein one of the inside connector terminals, one of the outside connector terminals, and one of the connecting conductors are made of a continuous conductive material.

3. An electrical equipment connected to external equipment via an external harness, said electrical equipment comprising:
    an internal electrical component including a component-side connector and component-side terminals;
    a case-shaped housing body having a two-part divided structure with a front case section and a rear case section, the case-shaped housing body housing the internal electrical component therein;
    an inside connector section that is connected to the component-side connector, the inside connector:

being provided integrally on an inner surface side of the housing body; and
having inside connector terminals; and
an outside connector section that is electrically connected to the external harness, the outside connector section:
being provided integrally on an outer surface side of the housing body; and
having outside connector terminals;
wherein:
the inside connector terminals and the outside connector terminals are connected by connecting conductors provided in the housing body;
the rear case section, the outside connector section and an inside connector section are integrally molded with resin; and
one of the inside connector terminals, one of the outside connector terminals, and one of the connecting conductors are made of a continuous conductive material; and
the component-side terminals are mated to the inside connector section terminals by insertion engagement between respective terminals.

4. The electrical equipment according to claim 1, wherein the inside connector terminals and the connecting conductors are made of a continuous conductive material and a first end of the continuous conductive material is formed with a smaller diameter than a second end of the continuous conductive material.

5. The electrical equipment according to claim 1, wherein the external harness includes a plurality of wires that terminate at the outside connector.

6. The electrical equipment according to claim 1, wherein the front case section has an imaging window.

7. The electrical equipment according to claim 1, wherein the internal electrical component is an imaging element.

8. The electrical equipment according to claim 1, wherein the connecting conductors change diameter of wires.

9. The electrical equipment according to claim 1, wherein the case-shaped housing body is waterproof.

10. The electrical equipment according to claim 3, wherein a first end of the continuous conductive material is formed with a smaller diameter than a second end of the continuous conductive material.

11. The electrical equipment according to claim 3, wherein the external harness includes a plurality of wires that terminate at the outside connector.

12. The electrical equipment according to claim 3, wherein the front case section has an imaging window and the connecting conductors are provided in the rear case section.

13. The electrical equipment according to claim 3, wherein the internal electrical component is a circuit substrate with an imaging element.

14. The electrical equipment according to claim 3, wherein the connecting conductors change diameter of wires.

15. The electrical equipment according to claim 3, wherein the case-shaped housing body is waterproof.

16. The electrical equipment according to claim 1, wherein the inside connector terminals and the connecting conductors are made of a continuous conductive material and an inside end of the continuous conductive material is formed with a smaller diameter than an outside end of the continuous conductive material.

17. The electrical equipment according to claim 1, wherein the continuous conductive material includes a first end and a second end, and
wherein both the first and second ends of the continuous conductive material are male terminals.

18. The electrical equipment according to claim 3, wherein an inside end of the continuous conductive material is formed with a smaller diameter than an outside end of the continuous conductive material.

19. The electrical equipment according to claim 3, wherein the continuous conductive material includes a first end and a second end, and
wherein both the first and second ends of the continuous conductive material are male terminals.

* * * * *